Figure 1:
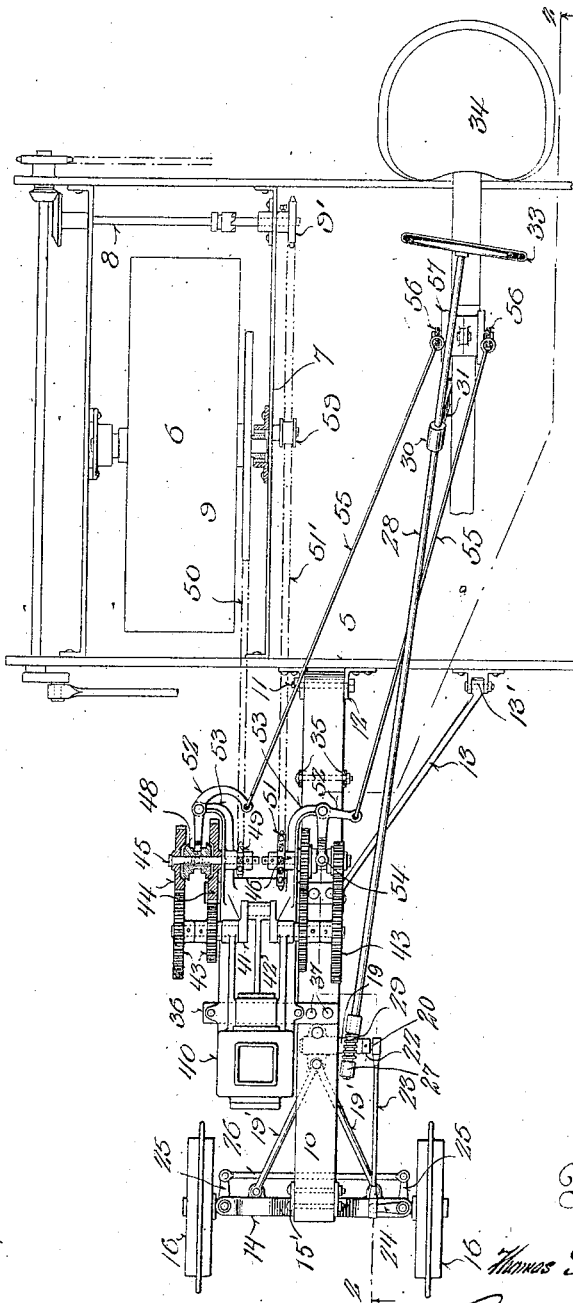

T. G. MABLEY.
MOTOR DRIVING ATTACHMENT FOR BINDERS.
APPLICATION FILED SEPT. 1, 1915.

1,214,564.

Patented Feb. 6, 1917.
3 SHEETS—SHEET 1.

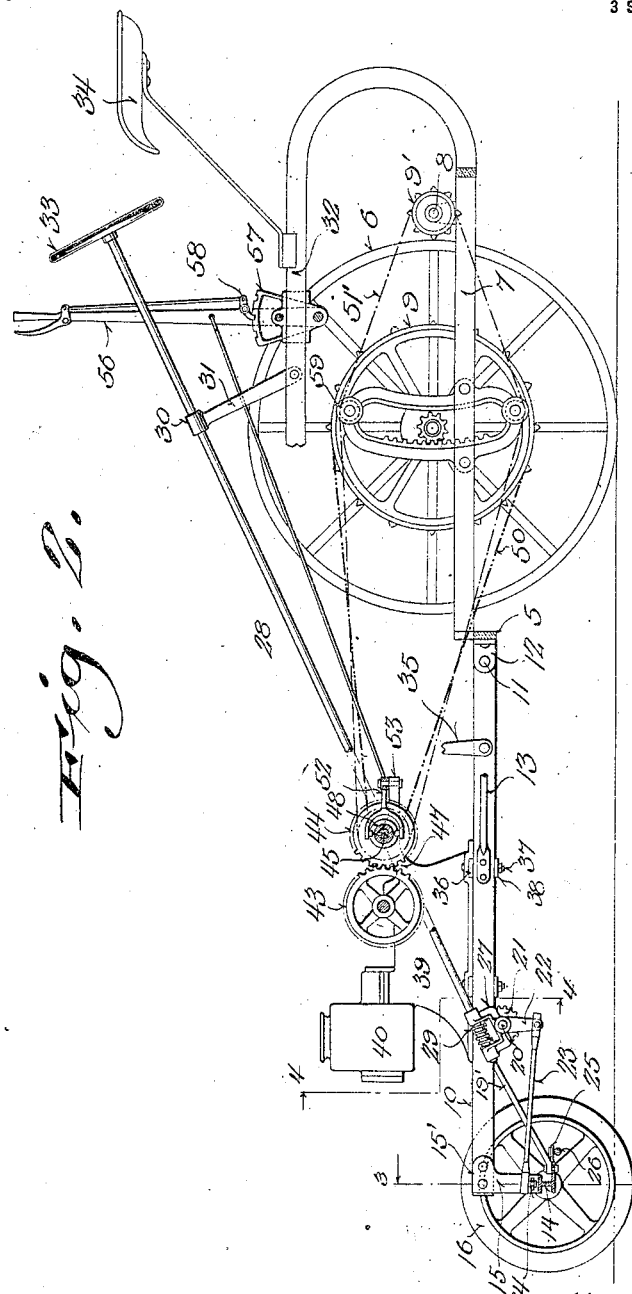

T. G. MABLEY.
MOTOR DRIVING ATTACHMENT FOR BINDERS.
APPLICATION FILED SEPT. 1, 1915.

1,214,564.

Patented Feb. 6, 1917.
3 SHEETS—SHEET 3.

UNITED STATES PATENT OFFICE.

THOMAS G. MABLEY, OF MENOMONEE FALLS, WISCONSIN.

MOTOR-DRIVING ATTACHMENT FOR BINDERS.

1,214,564.   Specification of Letters Patent.   Patented Feb. 6, 1917.

Application filed September 1, 1915. Serial No. 48,538.

*To all whom it may concern:*

Be it known that I, THOMAS G. MABLEY, a citizen of the United States, and resident of Menomonee Falls, in the county of Waukesha and State of Wisconsin, have invented certain new and useful Improvements in Motor-Driving Attachments for Binders; and I do hereby declare that the following is a full, clear, and exact description thereof.

This invention relates to new and useful improvements in motor driving means for agricultural and other machines adapted to be propelled over the ground and including independently movable mechanisms, and is particularly directed to the provision of such means for operating binders.

In operating binders or like machines different working conditions are often encountered wherein it is desirable to vary the speed of operation of the mechanism with respect to the rate of progression of the machine, as for instance when a comparatively heavy stand of grain is encountered it would be desired to relatively accelerate the operation of the cutting and binding mechanism.

It is therefore an important object of the present invention to provide such an operating means wherein the propelling wheels of the machine and the mechanism of the machine are operated independently to permit of relatively variable speeds being imparted thereto.

Another important object of the invention resides in the provision of such operating means comprising an independent unit which may be associated with binders of existing types in a manner requiring but very slight modification of the structures of such binders.

A further object resides in the provision of such an operating means which comprises a truck member carrying the driving means and attachable to a binder in the manner of the usual draft tongues which are provided on binders, whereby in a motor driven arrangement means may be provided for steering the binder and for adjustably supporting the forward portion thereof, and further whereby the weight of the drive means is not supported in a manner tending to excessively strain the binder structure.

With the above and other objects and advantages in view, the invention resides more particularly in the novel combination, arrangement and formation of parts more particularly hereinafter described and particularly pointed out in the appended claims.

Figure 4:
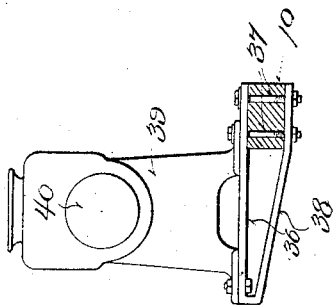
Figure 3:
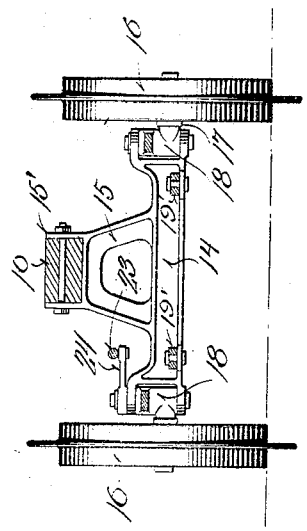

Reference is had to the accompanying drawings wherein similar characters of reference designate corresponding parts throughout the several views and in which:

Figure 1 is a top plan view showing conventionally portions of a binder structure with the improved operating means associated therewith; Fig. 2 is a vertical sectional view taken on the line 2—2 of Fig. 1; Fig. 3 is a detailed sectional view taken transversely on the line 3—3 of Fig. 2 and showing the mounting of the wheels of the truck, and Fig. 4 is a transverse sectional view on the line 4—4 of Fig. 2, showing the motor support.

Referring now more particularly to the accompanying drawings there is shown in conventional outline portions of a binder structure including the front sill 5, the bull wheel or main driving wheel 6 which is carried by transverse bars 7 of the frame, and the rear shaft 8 which in usual structures is driven by the sprocket-wheel 9 carried on the bull-wheel axle. This shaft 8 carries a sprocket-wheel 9′ whereby such driving action is effected. In the present arrangement shown on the drawings the shaft 8 is of greater length than the shaft usually employed, and the sprocket 9′ is positioned on the inner end of the shaft and forwardly of the inner bar 7.

The improved driving and guiding attachment includes a truck which is formed of a beam 10, which projects forwardly from the binder in the position usually occupied by the tongue thereof and which is pivotally connected to the binder by a bolt 11 passing through said beam and through outstanding ears 12 carried by the sill 5. A brace 13 is secured intermediately to the beam and extends diagonally inwardly to a pivotal connection 13′ with the binder sill 5. An axle 14 is carried at the front of the beam and is rigidly secured thereto by a bracket 15 upstanding from said axle and carrying spaced ears 15′ embracing and bolted to the beam. Wheels 16 are provided on stub axles 17 which are carried by spindles 18 pivotally at the ends of the axle in the general manner found in automobile constructions. A sleeve casting 19 is secured to and depends from the forward portion of the beam and mounted in this casting is a shaft 20 which carries a worm gear 21 and a depending arm 22 to which is pivotally secured a link 23 extending forwardly and pivoted to an inwardly directed arm 24 rigidly carried by one of the wheel spindles 18. Arms 25 extend rearwardly from both spindles and a steering rod 26 connects the arms, whereby both wheels are simultaneously steered. Radius rods 19' are connected to the axle 14 and to the casting 19. For actuating this steering mechanism, the shaft 20 loosely carries a U-shaped member 27, the arms of which are formed with bearings for receiving the forward end of a steering shaft 28.
Between these arms the shaft carries a worm 29 meshing with the worm gear 21. The rear portion of the shaft is mounted in a bearing 30 carried by an arm 31 upstanding from the forward portion of the seat-bar 32 of the machine and terminally carries a steering wheel 33 adjacent the driver's seat 34.

To the rear portion of the beam are secured upstanding links 35 which are connected to the usual mechanism for determining the elevation of the forward portion of the machine, these being the links that are usually connected to the draft tongue of the machine. Thus it will be seen that this truck supplants the usual draft tongue and serves to steer the machine and to support the front end thereof. Spaced bars 36 are secured by the bolts 37 to the intermediate portion of the beam and extend laterally therefrom, with their outer portions bent diagonally backward at 38 and secured at their extremities to the bolts 37 under the beam to form braces. These bars 36 carry the base 39 of an engine 40, this engine preferably being the usual type of gasolene engine, although any other type may be employed.

The engine includes the crank-shaft 41 which extends transversely of the truck and is connected to the pitman 42. Each outer end of the crank-shaft is provided with a pair of gear-wheels 43 of different size and corresponding gear-wheels 44 are loosely mounted on countershafts 45 adjacent each end of the crank-shafts, these counter-shafts being preferably carried by bearings 46 formed on arms 47 projecting from the engine base. A double cone clutch 48 is provided between the gear-wheels of each counter-shaft and is adapted to engage either of the wheels to thus impart a variable speed to the respective counter-shafts. The inner end of that counter-shaft most adjacent the bull-wheel carries a sprocket-wheel 49 and a sprocket-chain 50 is trained around said wheel and around the sprocket 9 of the bull-wheel. The inner end of the other counter-shaft carries a sprocket-wheel 51, around which is trained a sprocket-chain 51' which extends to and around the sprocket-wheel 9' of the shaft 8 which drives the mechanism of the machine.

For actuating the clutch members of the counter-shafts, bell crank levers 52 are pivoted to lateral extensions 53 of the arms 47 which carry the counter-shafts and have corresponding arms bifurcated at 54 to operatively engage the clutch members. To the other arms of the levers are pivoted links 55 which extend to and are pivotally connected with levers 56 upstanding from and pivoted to the seat-bar. Arcuate racks 57 are provided with these levers and grip-operated pawls 58 are carried by the levers to engage these racks. Thus a means is provided whereby the propelling wheel of the machine may be operated independently of the mechanism of the machine, and whereby the wheel and mechanism may be operated at variable relative speeds.

By attaching the engine and transmission mechanism on the truck which supports and steers the front of the machine, an exceedingly compact unit is provided which which may be associated with the machine in a very ready manner, and a further advantage exists in that a minimum amount of strain is placed on the binder by the weight of the engine. Although there has been shown and described a specific form of transmission mechanism, it is obvious that any form of variable speed transmission which can be operated readily from the driver's seat may be employed.

In the arrangement shown in the drawings, certain mechanism of the binder is disposed between the sprocket 9' and the sprocket 46 and to hold the chain 51' connecting the sprockets clear of such mechanism, adjustable guide sheaves 59, are secured to the binder structure above and below the position of such mechanism. In the construction shown, the shaft 8 usually provided on the machine would be removed and a longer shaft replaced which would extend past the bar 7. In certain constructions, however, the arrangement of the binder mechanism is such that the sprocket wheel 9' may be positioned on the shaft 8 on the outer side of the bar 7 to have an operative connection with the counter-shaft. In this arrangement the original shaft 8 of the binder could be employed.

I claim:

1. An attachment for binders and like machines adapted to travel over the ground and including independently movable mechanism, such attachment comprising a truck member adapted to be connected with a machine, drive means carried by said member, and independent variable speed connections between the said drive means and a ground wheel and the said machine mechanism respectively.

2. An attachment for binders and like tiltable machines including a beam adapted to be secured to the machine in lieu of and in the manner of the usual draft tongue thereof, means for supporting and steering the forward portion of the beam, and means carried by said beam for driving the machine.

3. An attachment for binders and like machines including a gear carrying ground wheel and a gear carrying shaft driven from the gear of said wheel, said attachment comprising a member adapted to be connected with the machine, an engine carried by said member, a pair of counter-shafts, variable speed connections between the drive shafts of the engine and the counter-shafts, and gears on said counter-shafts adapted to be connected with the named gears of the machine upon arranging them in lateral displacement and removing their normal connecting means.

4. An attachment for binders and like machines including a gear carrying ground wheel and a gear carrying shaft driven from the gear of said wheel, said attachment comprising a truck for steering the machine and supporting its forward portion adapted to be secured to the machine in the manner of and in lieu of the usual draft tongue thereof, an engine carried on the truck, a pair of counter-shafts, variable speed connections between the drive shaft of the engine and the counter-shafts, and gears on said counter-shafts adapted to be connected with the named gears of the machine gears upon arranging them in lateral displacement and removing their normal connecting means.

5. A driving attachment for binders and like machines comprising a body member having a steerable support at one end and having its other end adapted for securement to a machine in lieu of and in the manner of the usual draft tongue of the machine, whereby working portions of the machine may be held at different desired elevations, an engine mounted on the body member, a drive means connecting the engine and movable portions of the machine, a control means for the drive means, a steering control means, and both of said control means being operable from the operator's seat of the machine.

In testimony that I claim the foregoing I have hereunto set my hand at Milwaukee, in the county of Milwaukee and State of Wisconsin, in the presence of two witnesses.

THOMAS G. MABLEY.

Witnesses:
 DOROTHY DOUCETTE,
 M. E. DOWNEY.